(12) United States Patent
Gu et al.

(10) Patent No.: US 11,698,568 B2
(45) Date of Patent: Jul. 11, 2023

(54) SUBSTRATE AND DISPLAY PANEL

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Xun Gu, Beijing (CN); Wenjuan Mei, Beijing (CN); Wenquan Chu, Beijing (CN); Hanqi Chu, Beijing (CN); Hailong Yang, Beijing (CN); Shibao Wang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 299 days.

(21) Appl. No.: 17/124,538

(22) Filed: Dec. 17, 2020

(65) Prior Publication Data
US 2021/0191225 A1 Jun. 24, 2021

(30) Foreign Application Priority Data
Dec. 18, 2019 (CN) .......................... 201911309325.7

(51) Int. Cl.
*G02F 1/1676* (2019.01)
*G02F 1/166* (2019.01)
(Continued)

(52) U.S. Cl.
CPC ............ *G02F 1/1676* (2019.01); *G02F 1/166* (2019.01); *B82Y 20/00* (2013.01); *G02F 2001/1678* (2013.01)

(58) Field of Classification Search
CPC ............. H01L 29/7869; H01L 27/1225; H01L 29/78606; H01L 29/66969; H01L 29/66742; H01L 21/02565; H01L 29/78696; H01L 27/1214; H01L 29/41733; H01L 27/1248; H01L 29/78618; H01L 29/4908; H01L 21/02664; H01L 29/78693; H01L 29/04; H01L 27/3232; H01L 21/02502; H01L 21/02631; H01L 21/02554; H01L 21/3003; H01L 27/124; H01L 21/28008; H01L 29/78603; H01L 29/45; H01L 2924/0002; H01L 51/5281; H01L 51/56; H01L 27/1255;
(Continued)

(56) References Cited

U.S. PATENT DOCUMENTS

| 10,268,035 B2 * | 4/2019 | Kim ..................... G02B 26/005 |
| 2009/0059348 A1 * | 3/2009 | Niwano ............... G02B 26/004 359/296 |

* cited by examiner

*Primary Examiner* — Brandi N Thomas
(74) *Attorney, Agent, or Firm* — Dority & Manning, P.A.

(57) ABSTRACT

A substrate includes a base, a pixel defining layer, a plurality of electrode pairs, and a plurality of light-emitting devices. The pixel defining layer is disposed on the base, and includes a plurality of through holes. At least one electrode pair includes a first electrode and a second electrode that are disposed at least on a hole wall of one of the through holes and at least partially opposite to each other, and the first electrode and the second electrode are insulated from each other. One of the plurality of light-emitting devices includes a liquid functional layer disposed in the through hole. The liquid functional layer is in direct contact with the first electrode and the second electrode. The liquid functional layer includes a liquid light-emitting layer configured to emit light.

18 Claims, 17 Drawing Sheets

B-B'

(51) Int. Cl.
*B82Y 20/00* (2011.01)
*G02F 1/1675* (2019.01)

(58) Field of Classification Search
CPC ........... H01L 27/3246; H01L 29/78669; H01L 27/3262; H01L 21/02488; H01L 27/3276; H01L 51/0005; H01L 27/1251; H01L 29/24; H01L 21/324; H01L 23/564; H01L 27/12; H01L 29/42384; H01L 29/786; H01L 33/0095; H01L 21/02266; H01L 21/02323; H01L 27/1292; H01L 27/283; H01L 27/32; H01L 27/3211; H01L 33/62; H01L 51/0007; H01L 51/50; H01L 51/5203; H01L 21/02175; H01L 21/0242; H01L 21/02422; H01L 21/02472; H01L 21/02483; H01L 21/02592; H01L 21/02609; H01L 21/0262; H01L 21/02667; H01L 21/383; H01L 21/441; H01L 21/473; H01L 21/47576; H01L 21/477; H01L 2227/32; H01L 2251/5315; H01L 27/1218; H01L 27/14627; H01L 27/156; H01L 27/322; H01L 27/3244; H01L 27/326; H01L 27/3283; H01L 29/045; H01L 29/06; H01L 29/401; H01L 29/42356; H01L 29/7831; H01L 51/0508; H01L 51/0516; H01L 51/0529; H01L 51/5088; H01L 51/5246; H01L 21/265; H01L 21/42; H01L 21/471; H01L 22/10; H01L 2227/323; H01L 2251/56; H01L 25/0753; H01L 25/167; H01L 27/3223; H01L 27/3227; H01L 27/3234; H01L 27/3258; H01L 27/3274; H01L 29/66765; H01L 29/78645; H01L 29/78648; H01L 2924/00; H01L 33/20; H01L 33/36; H01L 35/32; H01L 51/0003; H01L 51/0545; H01L 51/055; H01L 51/0558; H01L 51/105; H01L 51/5012; H01L 51/524; H01L 51/5271; H01L 21/02304; H01L 21/677; H01L 21/76802; H01L 21/76804; H01L 2251/5338; H01L 23/53295; H01L 27/1244; H01L 27/1266; H01L 27/14621; H01L 27/14623; H01L 27/14625; H01L 27/14645; H01L 27/3213; H01L 27/3267; H01L 27/3269; H01L 27/3272; H01L 29/413; H01L 2924/01042; H01L 2933/0066; H01L 33/005; H01L 33/24; H01L 33/32; H01L 33/405; H01L 51/0011; H01L 51/0024; H01L 51/0026; H01L 51/442; H01L 51/5016; H01L 51/5036; H01L 51/5056; H01L 51/52; H01L 51/5206; H01L 51/5237; H01L 51/5265; H01L 51/5275; H01L 51/5284; G02F 1/13394; G02F 1/134309; G02F 1/133707; G02F 1/1368; G02F 1/1337; G02F 1/133377; G02F 1/1393; G02F 1/1334; G02F 1/133514; G02F 1/1339; G02F 1/13398; G02F 1/167; G02F 1/13471; G02F 1/133512; G02F 1/29; G02F 1/294; G02F 1/1335; G02F 1/13; G02F 1/1347; G02F 1/134336; G02F 1/13439; G02F 1/137; G02F 1/1333; G02F 1/13718; G02F 1/133528; G02F 1/13306; G02F 1/136286; G02F 1/13725; G02F 2202/28; G02F 1/1323; G02F 1/13338; G02F 1/13396; G02F 1/134372; G02F 1/13475; G02F 2201/123; G02F 1/13345; G02F 1/133742; G02F 1/1341; G02F 1/134318; G02F 1/134363; G02F 2202/043; G02F 1/133345; G02F 1/13452; G02F 1/1375; G02F 2201/14; G02F 2201/52; G02F 1/133555; G02F 1/1343; G02F 1/134345; G02F 1/1345; G02F 1/13478; G02F 1/136; G02F 2201/122; G02F 1/134327; G02F 1/134381; G02F 1/13334; G02F 1/133526; G02F 1/13473; G02F 1/13624; G02F 1/292; G02F 2201/121; G02F 2201/44; G02F 1/133305; G02F 1/133531; G02F 1/13476; G02F 1/13712; G02F 2203/62; G02F 1/0107; G02F 1/1326; G02F 1/133; G02F 1/13373; G02F 1/136213; G02F 1/1681; G02F 2001/1678; G02F 2201/128; G02F 2201/343; G02F 1/133504; G02F 1/133603; G02F 1/133615; G02F 1/133723; G02F 1/13392; G02F 1/13415; G02F 1/1362; G02F 1/136227; G02F 1/17; G02F 1/19; G02F 1/0102; G02F 1/133308; G02F 1/133354; G02F 1/133371; G02F 1/133388; G02F 1/133509; G02F 1/133612; G02F 1/133738; G02F 1/133746; G02F 1/133753; G02F 1/133784; G02F 1/133788; G02F 1/13458; G02F 1/136222; G02F 1/141; G02F 1/16757; G02F 1/1676; G02F 1/1679; G02F 2201/086; G02F 2201/124; G02F 2203/64; G02F 1/0128; G02F 1/0316; G02F 1/1313; G02F 1/13312; G02F 1/133351; G02F 1/133357; G02F 1/133365; G02F 1/133368; G02F 1/13347; G02F 1/133516; G02F 1/133519; G02F 1/133536; G02F 1/133541; G02F 1/133565; G02F 1/133602; G02F 1/13363; G02F 1/133638; G02F 1/133757; G02F 1/13606; G02F 1/136209; G02F 1/1365; G02F 1/13793; G02F 1/1523; G02F 1/1533; G02F 1/155; G02F 1/165; G02F 1/1675; G02F 2201/34; G02F 2202/32; G02F 2202/36; G02F 2202/38; G02F 2203/02; G02F 2203/03; G02F 2203/09; G02F 2203/34; G02F 2203/48; G02F 2413/02; G02F 2413/05; G02F 1/133302; G02F 1/133342; G02F 1/133397; G02F 1/133502; G02F 1/133524; G02F 1/133543; G02F 1/133614; G02F 1/133621; G02F 1/133624; G02F 1/13454; G02F 1/13706; G02F 1/13737; G02F 1/13756; G02F 1/139; G02F 1/1391; G02F 1/1396; G02F 1/16762; G02F 1/291; G02F 2201/30; G02F 2201/40; G02F 2201/50; G02F 2201/56; G02F 2202/16; G02F 2202/22; G02F 2202/42; G02F 2203/01; G02F 2203/12; G02F 2203/28; G02F 2203/30; G02B 30/27; G02B 26/005; G02B 30/31; G02B 26/004; G02B 3/14; G02B 30/28; G02B 26/02; G02B 3/12; G02B 5/20; G02B 27/017; G02B 30/30; G02B 27/0172;

G02B 30/00; G02B 2027/0118; G02B 2027/0178; G02B 26/026; G02B 3/005; G02B 3/0087; G02B 2027/0105; G02B 2027/0174; G02B 26/0833; G02B 26/101; G02B 27/283; G02B 30/25; G02B 26/007; G02B 3/08; G02B 30/36; G02B 5/201; G02B 1/06; G02B 1/10; G02B 1/12; G02B 2207/115; G02B 26/105; G02B 27/0093; G02B 27/48; G02B 3/0075; G02B 5/0242; G02B 2027/014; G02B 26/002; G02B 2027/0127; G02B 2027/0163; G02B 26/08; G02B 26/0808; G02B 27/0018; G02B 27/646; G02B 30/26; G02B 5/30; G02B 2027/0125; G02B 2027/0132; G02B 2027/0183; G02B 27/0149; G02B 27/0176; G02B 27/0179; G02B 27/02; G02B 30/24; G02B 30/29; G02B 30/32; G02B 30/52; G02B 5/0284; G02B 5/06; G02B 5/223; G02B 5/3016; G02B 6/0011; G02B 6/0036; G02B 7/04

See application file for complete search history.

B-B'

B-B'

SUBSTRATE AND DISPLAY PANEL

CROSS-REFERENCE TO RELATED APPLICATION

This application claims priority to Chinese Patent Application No. 201911309325.7, filed on Dec. 18, 2019, which is incorporated herein by reference in its entirety.

TECHNICAL FIELD

The present disclosure relates to the field of display technologies, and in particular, to a substrate and a display panel.

BACKGROUND

A liquid light-emitting device includes a light-emitting layer including a liquid light-emitting material. The liquid light-emitting devices may be widely used in flexible display devices and non-flexible display devices.

SUMMARY

In an aspect, a substrate is provided. The substrate includes a base, a pixel defining layer, a plurality of electrode pairs, and a plurality of light-emitting devices. The pixel defining layer is disposed on the base, and layer includes a plurality of through holes. At least one electrode pair includes a first electrode and a second electrode that are disposed at least on a hole wall of one of the through holes and at least partially opposite to each other, and the first electrode and the second electrode are insulated from each other. One of the plurality of light-emitting devices includes a liquid functional layer, and the liquid functional layer is disposed in the through hole. The liquid functional layer is in direct contact with the first electrode and the second electrode. The liquid functional layer includes a liquid light-emitting layer configured to emit light.

In some embodiments, the first electrode and the second electrode each extend along the hole wall from an edge of the hole wall away from the base to a lower surface of the liquid light-emitting layer proximate to the base.

In some embodiments, the liquid functional layer further includes a liquid encapsulation layer. The liquid encapsulation layer is disposed on a side of the liquid light-emitting layer away from the base and is in direct contact with the liquid light-emitting layer. The liquid light-emitting layer includes a first liquid, and the liquid encapsulation layer includes a second liquid immiscible with the first liquid. A density of the second liquid is less than a density of the first liquid.

In some embodiments, the first electrode and the second electrode each extend along the hole wall from an edge of the hole wall away from the base to a surface of the liquid encapsulation layer in contact with the liquid light-emitting layer.

In some embodiments, a relative molecular mass of the first is greater than a relative molecular mass of the second liquid.

In some embodiments, the first liquid includes an organic solvent and a dispersant dissolved in the organic solvent.

In some embodiments, the plurality of electrode pairs includes at least one electrode pair which includes a first electrode connected to and integrated with another first electrode of an adjacent electrode pair, and second electrodes of any two adjacent electrode pairs are insulated from each other.

In some embodiments, the first electrode and the second electrode are disposed in a same layer.

In some embodiments, the substrate further includes a plurality of first power lines and a plurality of second power lines that are disposed on the base and insulated from each other. The first electrode is electrically connected to a corresponding one of the first power lines, and the second electrode is electrically connected to a corresponding one of the second power lines.

In some embodiments, the light-emitting device further includes a third electrode and a fourth electrode, and the third electrode and the fourth electrode are both insulated from the first electrode and the second electrode. The third electrode is located at a side of the liquid functional layer proximate to the base, and the fourth electrode is located at a side of the liquid functional layer away from the base.

In some embodiments, fourth electrodes in the plurality of light-emitting devices are integrated to form an integrated structure, and the integrated structure covers the pixel defining layer.

In some embodiments, the substrate further includes an insulating layer disposed between the fourth electrodes and the plurality of electrode pairs. The insulating layer includes a plurality of hollowed-out portions, each hollowed-out portion corresponds to a through hole, and a projection of the hollowed-out portion on the base overlaps with an orthographic projection of the through hole on the base.

In some embodiments, the light-emitting device further includes a hole injection layer, a hole transport layer, an electron injection layer, and an electron transport layer. The hole injection layer is located between the third electrode and the liquid functional layer. The hole transport layer is located between the hole injection layer and the liquid functional layer. The electron injection layer is located between the fourth electrode and the liquid functional layer. The electron transport layer is located between the electron injection layer and the liquid functional layer.

In some embodiments, the substrate further includes a plurality of pixel driver circuits disposed between the base and the plurality of light-emitting devices. Each pixel driver circuit is electrically connected to a third electrode of a corresponding light-emitting device, and the pixel driver circuit is configured to drive the liquid light-emitting layer to emit light.

In some embodiments, the substrate further includes a solid encapsulation layer disposed on a side of the light-emitting device away from the base. The solid encapsulation layer covers the pixel defining layer.

In some embodiments, the first electrode and the second electrode are made of the same material.

In some embodiments, the liquid light-emitting layer includes a first liquid and particles suspended in the first liquid, and the particles are quantum dots.

In another aspect, a display panel is provided. The display panel includes the substrate in any one of the above embodiments.

In some embodiments, the display panel further includes a backlight, and the substrate is disposed at a light-exit side of the backlight. The liquid light-emitting layer includes a first liquid and particles suspended in the first liquid, and the particles are quantum dots.

BRIEF DESCRIPTION OF THE DRAWINGS

In order to explain technical solutions in embodiments of the present disclosure more clearly, the accompanying drawings used in some embodiments of the present disclosure will be introduced briefly below. However, the accompanying drawings to be described below are merely some illustrative embodiments of the present disclosure, and a person of ordinary skill in the art can obtain other drawings according to these drawings without paying any creative effort. In addition, the accompanying drawings to be described below may be regarded as schematic diagrams, and are not limitations on actual sizes of products, an actual process of a method and actual timings of signals that the embodiments of the present disclosure relate to.

DETAILED DESCRIPTION

Figure 1:
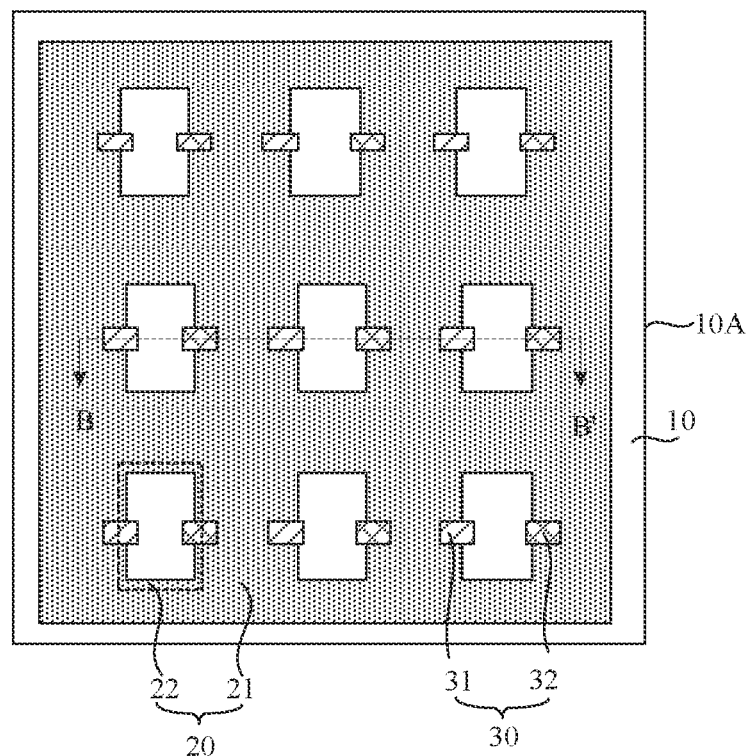
FIG. 1 is a top view of a substrate, in accordance with some embodiments.

Technical solutions in some embodiments of the present disclosure will be described below clearly and completely with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "inclusive, but not limited to". In the description, the terms such as "one embodiment," "some embodiments," "exemplary embodiments," "example," "specific example," or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the terms "a plurality of" and "the plurality of" each mean two or more unless otherwise specified. The phrase "A and/or B" includes the following three combinations: only A, only B, and a combination of A and B.

That C and D are disposed in a same layer means that C and D are formed on a same bearing surface by a process as follows: forming a film for forming a specific pattern by using a same film-forming process; performing a patterning process on the film by using a same mask to form a layer structure with specific patterns including C and D. Depending on the different specific patterns, the patterning process may include exposure, development and etching processes, and the specific patterns in the formed layer structure may be continuous or discontinuous, and these specific patterns may also be at different heights or have different thicknesses.

In the description of some embodiments, the term "connected" and its extensions may be used. For example, the term "connected" may be used in the description of some embodiments to indicate that two or more components are in direct physical or electric contact with each other. However, the term "connected" may also mean that two or more components are not in direct contact with each other but still cooperate or interact with each other. The embodiments disclosed herein are not necessarily limited to the contents herein.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

A liquid display device, such as a quantum dot light-emitting diode (QLED) display device, an electronic ink display device, a microcapsule display device, and a microlens array display device, may have a light-emitting layer that includes a clear liquid and a light-emitting material suspended in the organic solvent. The light-emitting layer is usually called a liquid light-emitting layer.

Figure 2A:
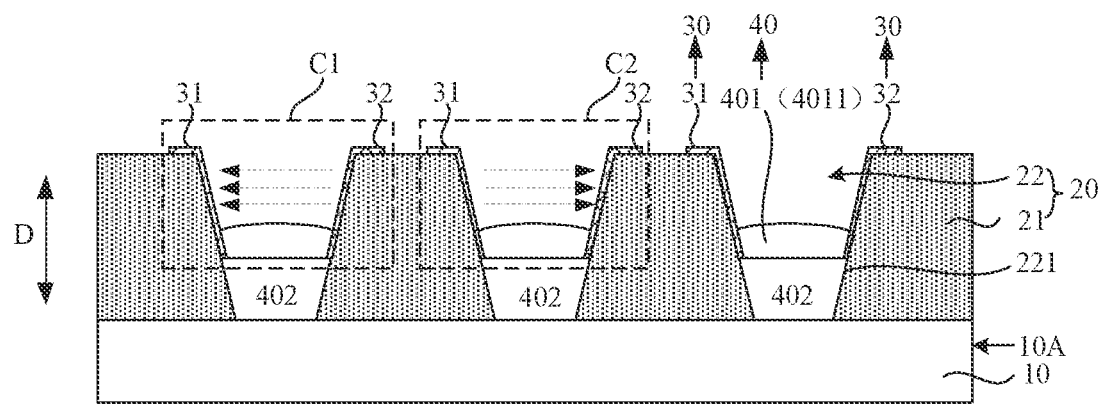
FIG. 2A is a sectional diagram of the substrate taken along direction B-B' in FIG. 1, in accordance with some embodiments.
Figure 2B:
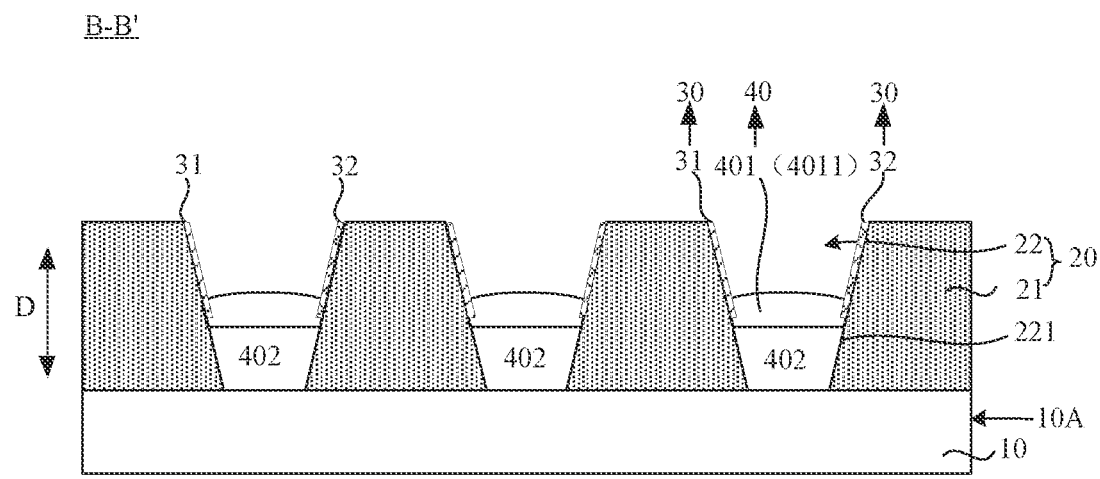
FIG. 2B is a sectional diagram of the substrate taken along direction B-B' in FIG. 1, in accordance with some embodiments.

Some embodiments of the present disclosure provide a substrate, which may be applied to the liquid display device. As shown in FIGS. 1, 2A and 2B, the substrate 100 includes a base 10, a pixel defining layer 20, a plurality of electrode pairs 30, and a plurality of light-emitting devices 40.

As shown in FIGS. 2A and 2B, the pixel defining layer 20 is disposed on the base 10 and includes a pixel defining layer body 21 and a plurality of through holes 22. Every two adjacent through holes 22 are separated by a portion of the pixel defining layer body 21 disposed therebetween.

In some examples, a material of the pixel defining layer body 21 includes an organic material and/or an inorganic material. For example, the organic material includes polystyrene or polyimide, and the inorganic material includes silicon nitride (SiNx), silicon oxide, or silicon oxynitride.

As shown in FIGS. 2A and 2B, the plurality of electrode pairs 30 are disposed on the pixel defining layer 20.

In some embodiments, as shown in FIGS. 2A and 2B, at least one electrode pair 30, such as each electrode pair 30, includes a first electrode 31 and a second electrode 32 that are insulated from each other. The first electrode 31 and the second electrode 32 are disposed at least on a hole wall 221 of a through hole 22 corresponding to the electrode pair 30.

In some examples, as shown in FIG. 2A, part of the first electrode 31 and part of the second electrode 32 are disposed opposite to each other on the hole wall 221 of the through hole 22, and the other part of the first electrode 31 and the other part of the second electrode 32 are disposed on a surface of the pixel defining layer body 21 facing away from the base 10, and in regions that are at a periphery of the through hole 22.

In some other examples, as shown in FIG. 2B, the whole first electrode 31 and the whole second electrode 32 are disposed opposite to each other on the hole wall 221 of the through hole 22.

It will be noted that the first electrode 31 and the second electrode 32 of each electrode pair 30 are disposed on a hole wall 221 of a same through hole 22, i.e., the through hole 22 corresponding to the electrode pair 30. In addition, there may be a preset distance between the first electrode 31 and the second electrode 32 to ensure that the first electrode 31 and the second electrode 32 of the electrode pair 30 are insulated from each other.

When two different voltages are applied to the first electrode 31 and the second electrode 32, an electric field is formed between the first electrode 31 and the second electrode 32 (in the case shown by FIG. 2B), or between a portion of the first electrode 31 located in the through hole 22 and a portion of the second electrode 32 located in the through hole 22 (in a case shown by FIG. 2A). A direction of the electric field is perpendicular to a thickness direction D of the base 10. The thickness direction D of the base 10 is a vertical direction in FIGS. 2A and 2B.

For example, as shown in FIG. 2A, in a case where a voltage at the first electrode 31 in a region C1 is less than a voltage at the second electrode 32 in the region C1, the direction (shown by the dashed arrows in the region C1) of the electric field points from the second electrode 32 to the first electrode 31, and the direction of the electric field is perpendicular to the thickness direction D of the base 10.

In another example, as shown in FIG. 2A, in a case where the voltage at the second electrode 32 in a region C2 is less than the voltage at the first electrode 31 in the region C2, the direction (shown by the dashed arrows in the region C2) of the electric field points from the first electrode 31 to the second electrode 32, and the direction of the electric field is perpendicular to the thickness direction D of the base 10.

In some examples, the first electrode 31 and the second electrode 32 are both made of metallic conductive materials. For example, the first electrode 31 and the second electrode 32 are made of metal elements or metal alloys. The metal element may be, for example, copper, aluminum, steel, tungsten, tin or lead. The metal alloy is, for example, a copper aluminum alloy.

In some other examples, the first electrode 31 and the second electrode 32 are both made of transparent conductive materials. For example, the transparent conductive material includes indium zinc oxide (IZO), indium tin oxide (ITO), aluminum zinc oxide (AZO) or indium fluorine oxide (IFO).

In addition, the materials of the first electrode 31 and the second electrode 32 may be the same or different, as long as an electric field perpendicular to the thickness direction of the base 10 may be formed between the first electrode 31 and the second electrode 32.

In some embodiments, as shown in FIGS. 2A and 2B, at least one light-emitting device 40, such as each light-emitting device 40, includes a liquid functional layer 401. The liquid functional layer 401 is disposed in the through hole 22 corresponding to the light-emitting device 40. The liquid functional layer 401 is in direct contact with at least a portion of the first electrode 31 and at least a portion of the second electrode 32. That is, as shown in FIGS. 1 to 2B, assuming that there is a plane parallel to a side face 10A of the base 10, and an orthographic projection of the liquid functional layer 401 on the plane overlaps at least partially with both an orthographic projection of the first electrode 31 on the plane and an orthographic projection of the second electrode 32 on the plane. The liquid functional layer 401 includes a liquid light-emitting layer 4011 configured to emit light to achieve a light-emitting function of the light-emitting device 40.

In some embodiments, as shown in FIGS. 2A and 2B, the light-emitting device 40 further includes a first solid functional layer 402 disposed between the liquid functional layer

401 and the base 10. The liquid functional layer 401 is in direct contact with the first solid functional layer 402. In some examples, the first solid functional layer 402 includes a third electrode that acts as an electrode of the light-emitting device 40. In some other examples, the first solid functional layer 402 includes a third electrode, a hole injection layer, and a hole transport layer that are sequentially stacked on the base 10 in the thickness direction D of the base 10.

In the related art, a surface tension at a central region of the liquid light-emitting layer 4011 is weaker than a surface tension at an edge region of the liquid light-emitting layer 4011, and thus gradients in surface tension may occur along the surface of the liquid light-emitting layer 4011. Since the Marangoni effect takes place when there is a gradient of surface tension at an interface between two phases (such as a liquid and a gas), the Marangoni effect may take place at the surface of the liquid light-emitting layer 4011. In addition, when the Marangoni effect takes place, the liquid flows in a direction from a low surface tension to a high surface tension. In this case, a portion at the central region of the liquid light-emitting layer 4011 may permeate into a portion at the edge region of the liquid light-emitting layer 4011, thereby causing the light-emitting material suspended in the clear liquid included in the liquid light-emitting layer 4011 to climb to an edge of the clear liquid, and further causing the liquid display device to emit light non-uniformly. In addition, the light-emitting material is prone to aggregate to form coarse crystals, which may cause concentrations of the light-emitting material at different positions of the liquid light-emitting layer 4011 to be different, and thus affects luminance uniformity of the liquid display device. In addition, the liquid light-emitting layer 4011 may be deformed due to the influence of gravity, which may also affect the luminance uniformity of the liquid display device.

However, in the embodiments, the electrode pair 30 includes the first electrode 31 and the second electrode 32. When different voltages are applied to the first electrode 31 and the second electrode 32, the voltage difference between the first electrode 31 and the second electrode 32 may create an electric field (shown in FIG. 2A) between the first electrode 31 and the second electrode 32. The electric field can electrowet the liquid functional layer 401 to change a contact angle of the liquid light-emitting layer 4011 of the liquid functional layer 401, thereby changing a curvature of the surface of the liquid light-emitting layer 4011, and causing the surface tension on the surface of the liquid light-emitting layer 4011 to be redistributed. A redistribution process of the surface tension makes the light-emitting material suspended in the clear liquid flow in a direction opposite to a flow direction caused by the Marangoni effect, thereby preventing the light-emitting material from climbing to the edge of the clear liquid of the liquid light-emitting layer 4011, and effectively preventing the light-emitting material from aggregating to form coarse crystals. In addition, since the curvature of the surface of the liquid light-emitting layer 4011 is changed, and a shape of the liquid light-emitting layer 4011 is changed accordingly, which may prevent the liquid light-emitting layer 4011 from being deformed due to the influence of gravity, and further ensure the luminance uniformity of the liquid display device.

Figure 3:
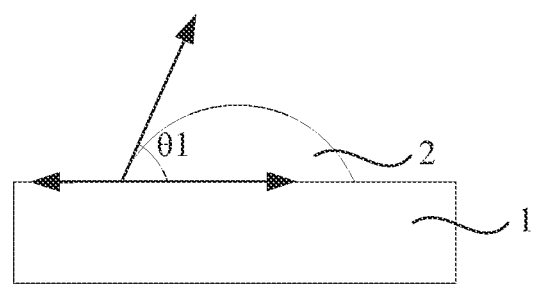
FIG. 3 is a schematic diagram of a contact angle in a three-phase system, in accordance with some embodiments.
Figure 4:
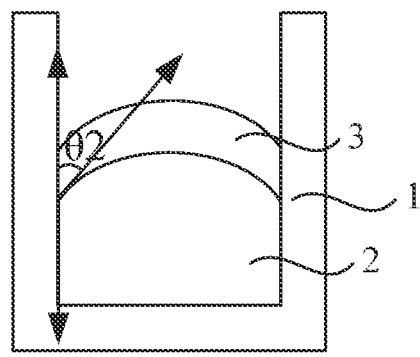
FIG. 4 is a schematic diagram of a contact angle in another three-phase system, in accordance with some embodiments.

Referring to FIGS. 3 and 4, the contact angle and the curvature will be described below by taking an example in which a droplet is located on a surface of a solid 1 and the solid 1 is placed in the air.

As shown in FIG. 3, at the three-phase boundary where the liquid, the gas, and the solid intersect, an angle θ1 between a solid-liquid interface and a gas-liquid interface is a contact angle between the droplet 2 and the solid 1.

As shown in FIG. 4, in addition to the three-phase system (i.e., a solid-liquid-gas system) shown in FIG. 3, there is another three-phase system formed by a one-phase solid and a two-phase fluid (i.e., two liquids). In the three-phase system shown in FIG. 4, the droplet 2 is located on a surface of the solid 1, and the droplet 3 and the droplet 2 are both in contact with and immiscible with the solid 1. In this case, an angle θ2 between a solid 1-droplet 3 interface and a droplet 3-droplet 2 interface is a contact angle between the droplet 2 and the droplet 3.

As shown in FIGS. 3 and 4, a change in a magnitude of the contact angle can cause a curvature of a surface of the droplet 2 to be changed. The magnitude of the contact angle is related to a degree to which the droplet 2 wets a medium with which the droplet 2 is in contact. As shown in FIG. 3, the larger the degree to which the droplet 2 wets the solid 1 is, the smaller the contact angle θ1 is. For example, the droplet 2 is a drop of water, and the solid 1 is a clean glass, a state in which the droplet 2 spreads out on the solid 1 is then a wet state, and the contact angle 1 is approximately 0°. In addition, the smaller the degree to which the droplet 2 wets the solid 1 is, the larger the contact angle θ1 is. For example, the droplet 2 is a drop of water, and the solid 1 is a waxy plate, a state in which the droplet 2 is kept to be a water drop is a non-wetting state, and the contact angle θ1 is approximately 180°.

As described above, the liquid light-emitting layer 4011 is in a liquid state, and may be taken as a droplet. It can be seen that, by changing the degree to which the liquid light-emitting layer 4011 wets the solid 1, the contact angle of the liquid light-emitting layer 4011 may be changed, and thus the curvature of the surface of the liquid light-emitting layer 4011 may be changed.

Figure 7A:
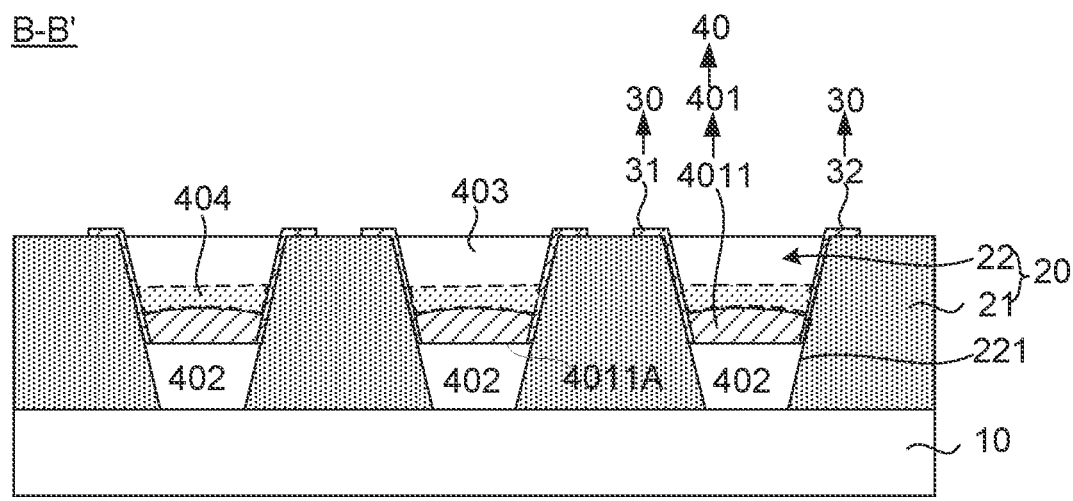
FIG. 7A is a sectional diagram of the substrate taken along direction B-B' in FIG. 1, in accordance with some embodiments.
Figure 7B:
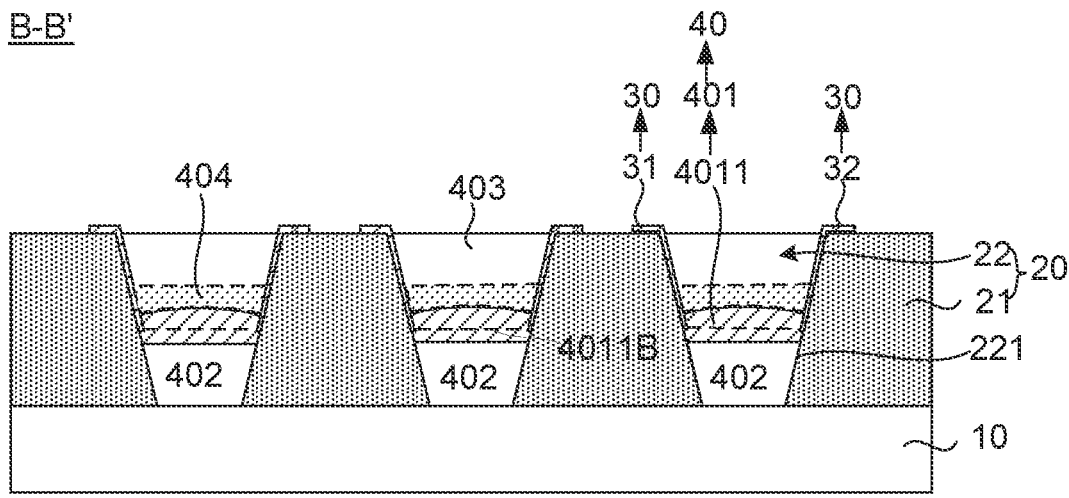
FIG. 7B is a sectional diagram of the substrate taken along direction B-B' in FIG. 1, in accordance with some embodiments.

In some embodiments, as shown in FIGS. 7A and 7B, the liquid functional layer 401 only includes the liquid light-emitting layer 4011. As shown in FIG. 7A, the first electrode 31 and the second electrode 32 each extend along the hole wall 221 of the through hole 22 from the edge of the hole wall 221 away from the base 10 to a lower surface 4011A of the liquid light-emitting layer 4011 proximate to the base 10. Of course, the first electrode 31 and the second electrode 32 may also extend along the hole wall 221 from the edge of the hole wall 221 away from the base 10 to a portion of the liquid light-emitting layer 4011 above the lower surface 4011A, such as a middle portion 4011B (shown in FIG. 7B) of the liquid light-emitting layer 4011. It will be noted that the middle portion 4011B of the liquid light-emitting layer 4011 refers to a line of the liquid light-emitting layer 4011 from which a distance to the lower surface of the liquid light-emitting layer 4011 is about a half of the thickness of the liquid light-emitting layer 4011. The thickness of liquid light-emitting layer 4011 is a dimension of the liquid light-emitting layer 4011 in the thickness direction D of the base 10.

Figure 8A:
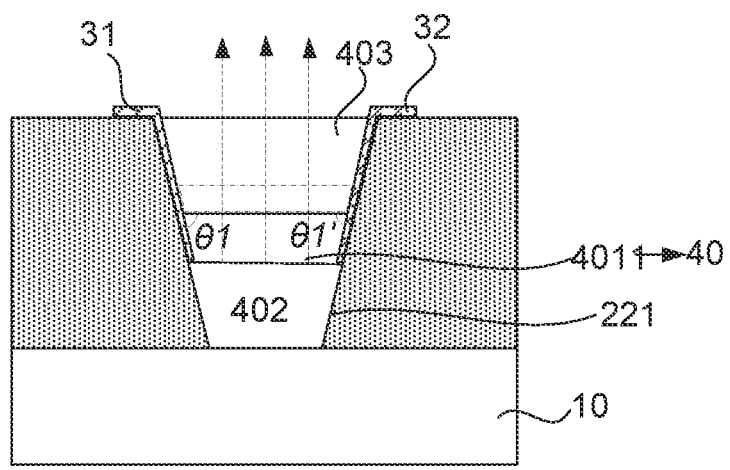
FIG. 8A is a partial sectional diagram of a substrate, in accordance with some embodiments.

In this case, as shown in FIG. 8A, two different voltages may be applied to the first electrode 31 and the second electrode 32 to change a contact angle θ1 between the liquid light-emitting layer 4011 and the first electrode 31 and a contact angle θ1' between the liquid light-emitting layer 4011 and the second electrode 32. In this way, a curvature of a light-exit surface of the liquid light-emitting layer 4011 is changed accordingly, which may make a thickness of the liquid light-emitting layer 4011 uniform. Therefore, the light (shown by the dashed arrows in FIG. 8A) emitted by the liquid light-emitting layer 4011 may be vertically emitted from the light-exit surface of the liquid light-emitting layer 4011, so that the light-emitting device 40 may emit light uniformly.

In some examples, as shown in FIGS. 7A to 8C, the liquid functional layer 401 only includes the liquid light-emitting layer 4011, the light-emitting device further includes a second solid functional layer 403 (e.g., an electron injection layer described hereinafter) disposed on a side of the liquid light-emitting layer 4011 away from the base 10, and there is a layer of air 404 between the liquid light-emitting layer 4011 and the second solid functional layer 403. This layer of air 404 will be referred to as a contact layer of the liquid light-emitting layer 4011 hereinafter.

In this case, as shown in FIG. 8A, the thickness of the liquid light-emitting layer 4011 is uniform, and a thickness of the contact layer is also uniform accordingly. The contact layer may be equivalent to a flat-plate lens, which will not converge or diverge the light emitted by the liquid light-emitting layer 4011. The light emitted by the liquid light-emitting layer 4011 may directly pass through the contact layer, and thus a viewing angle of the liquid display device may not be changed.

In addition, since the contact layer is in contact with the light-exit surface of the liquid light-emitting layer 4011, it is also possible to make the contact layer similar to a convex lens or a concave lens by appropriately adjusting the voltages applied to the first electrode 31 and the second electrode 32. In this case, the light emitted by the liquid light-emitting layer 4011 is converged or diverged after being refracted by the contact layer, thereby increasing or decreasing the viewing angle of the liquid display device.

Figure 8B:
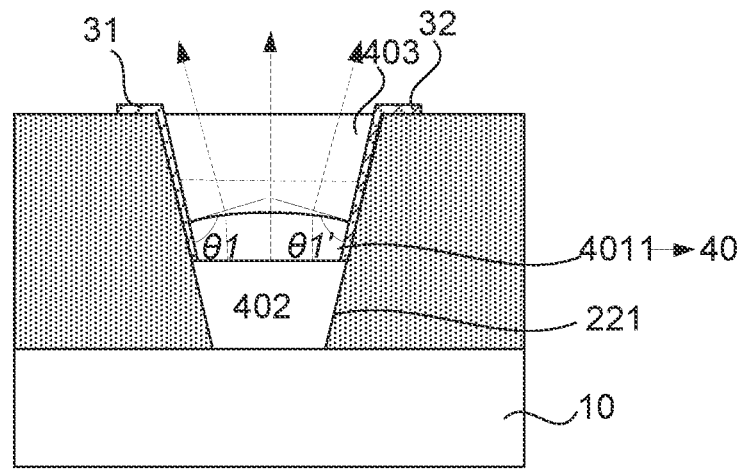
FIG. 8B is a partial sectional diagram of another substrate, in accordance with some embodiments.
Figure 8C:
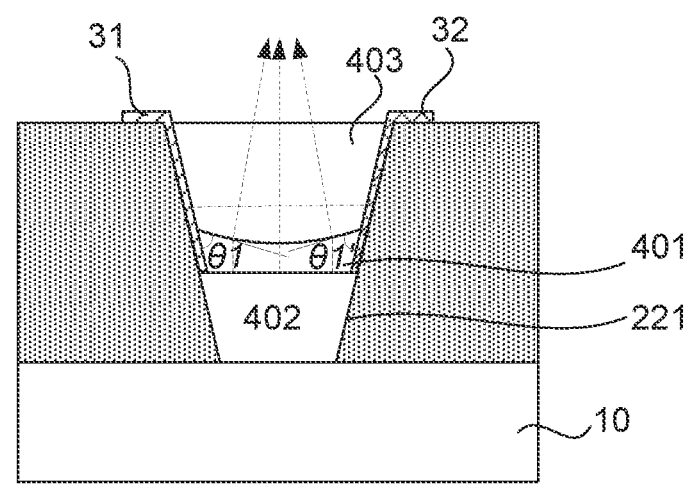
FIG. 8C is a partial sectional diagram of yet another substrate, in accordance with some embodiments.

For example, as shown in FIG. 8B, after the curvature of the light-exit surface of the liquid light-emitting layer 4011 is adjusted, the contact layer in contact with the light-exit surface of the liquid functional layer 401 may have a shape similar to a concave lens. In this case, the contact layer can diverge the light emitted by the liquid light-emitting layer 4011, thereby increasing the viewing angle of the liquid display device. In another example, as shown in FIG. 8C, the curvature of the light-exit surface of the liquid light-emitting layer 4011 is adjusted, so that the contact layer in contact with the light-exit surface of the liquid light-emitting layer 4011 has a shape similar to a convex lens. In this case, the contact layer can converge the light emitted by the liquid light-emitting layer 4011, thereby decreasing the viewing angle of the liquid display device.

In some embodiments, the liquid light-emitting layer 4011 includes a first liquid and particles suspended in the first liquid.

The first liquid is used to disperse the particles such that the particles disperse uniformly in the first liquid. For example, the first liquid is a clear liquid, and includes an organic solvent and a dispersant dissolved in the organic solvent. The dispersant is used to prevent the particles from settling or clumping. In some examples, the organic solvent is made of a high molecular polymer material, such as an aliphatic hydrocarbon, an aromatic hydrocarbon, a silylating agent, an alkylating agent, or a fluorocarbon.

The particles may be made of an organic light-emitting material or a semiconductor light-emitting material. For example, the organic light-emitting material includes polyphenylene, polythiophene, polyfluorene, polytriphenylamine, or a polytriphenylamine derivative. The semiconductor light-emitting material includes, for example, cadmium selenide (CdSe), cadmium sulfide (CdS), zinc selenide (ZnSe), zinc sulfide (ZnS), gallium phosphide (GaP), gallium arsenide phosphide (GaAs1-xPx), gallium aluminum arsenide (GaAlAs), or gallium nitride (GaN).

In a case where the particles are made of a quantum dot material (such as CdSe, or CdS) of the semiconductor light-emitting material, the particles are quantum dots. In this case, since a diameter of a quantum dot determines a color of light emitted by the quantum dot, a diameter of a quantum dot emitting light of a first color in the liquid light-emitting layer 4011, a diameter of a quantum dot emitting light of a second color in the liquid light-emitting layer 4011, and a diameter of a quantum dot emitting light of a third color in the liquid light-emitting layer 4011 may be different from each other. For example, if the first color, the second color, and the third color are red, green, and blue, respectively, the diameter of the quantum dot emitting red light in the liquid light-emitting layer 4011 is approximately 2.4 nm (such as 2.3 nm, 2.4 nm, or 2.5 nm), the diameter of the quantum dot emitting green light in the liquid light-emitting layer 4011 is approximately 1.7 nm (such as 1.5 nm, 1.6 nm, 1.7 nm, or 1.8 nm), and the diameter of the quantum dot emitting blue light in the liquid light-emitting layer 4011 is approximately 1.0 nm (such as 0.9 nm, 1.0 nm, or 1.1 nm).

In some embodiments, in addition to the liquid light-emitting layer 4011, the liquid functional layer 401 may further include other liquid layers. In this case, the liquid functional layer 401 has a multilayer structure, and adjacent liquid layers are in contact but immiscible. In some examples, the liquid light-emitting layer 4011 and/or the other liquid layers are formed in the through hole 22 by using an ink-jet printing process or a droplet-coating process.

Figure 10A:
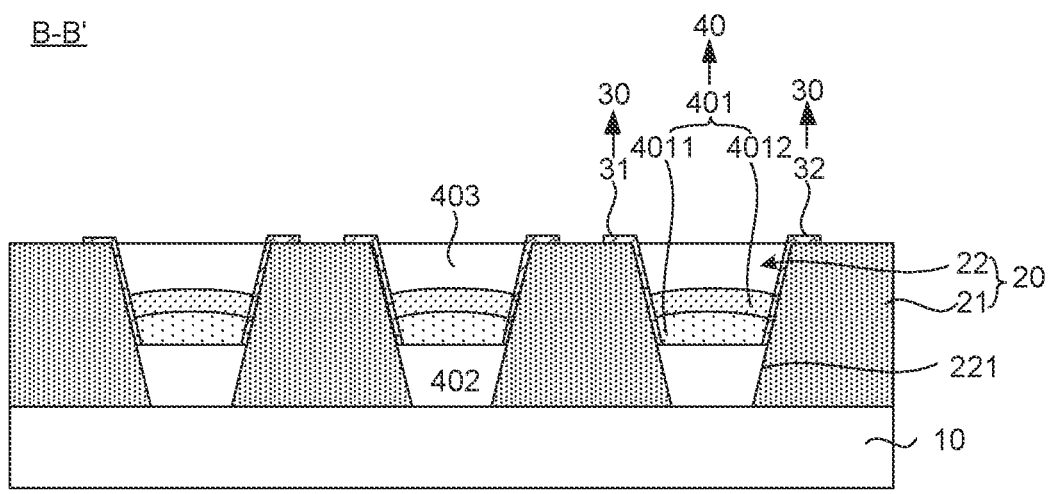
FIG. 10A is a sectional diagram of the substrate taken along direction B-B' in FIG. 1, in accordance with some embodiments.
Figure 10B:
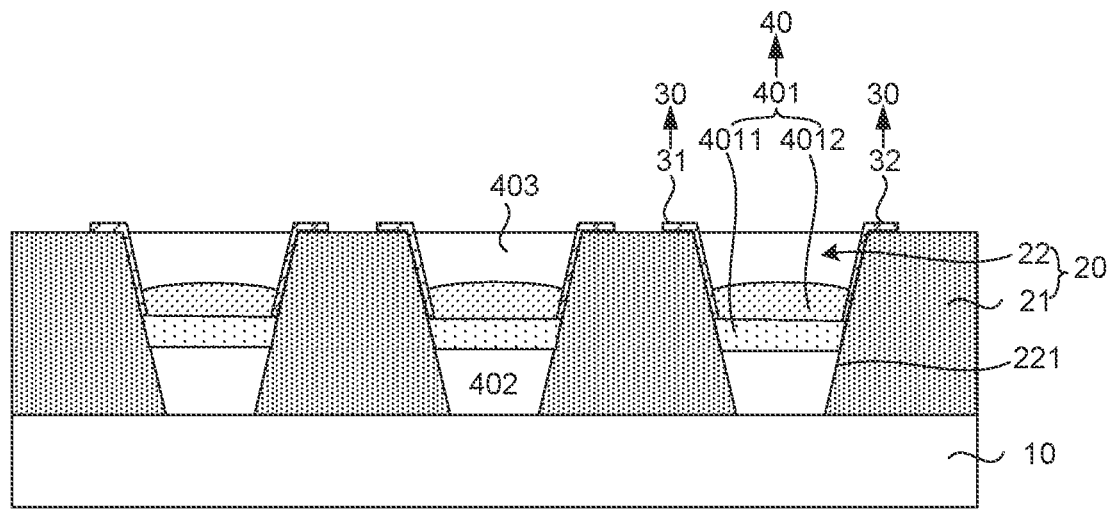
FIG. 10B is a sectional diagram of the substrate taken along direction B-B' in FIG. 1, in accordance with some embodiments.
Figure 10C:
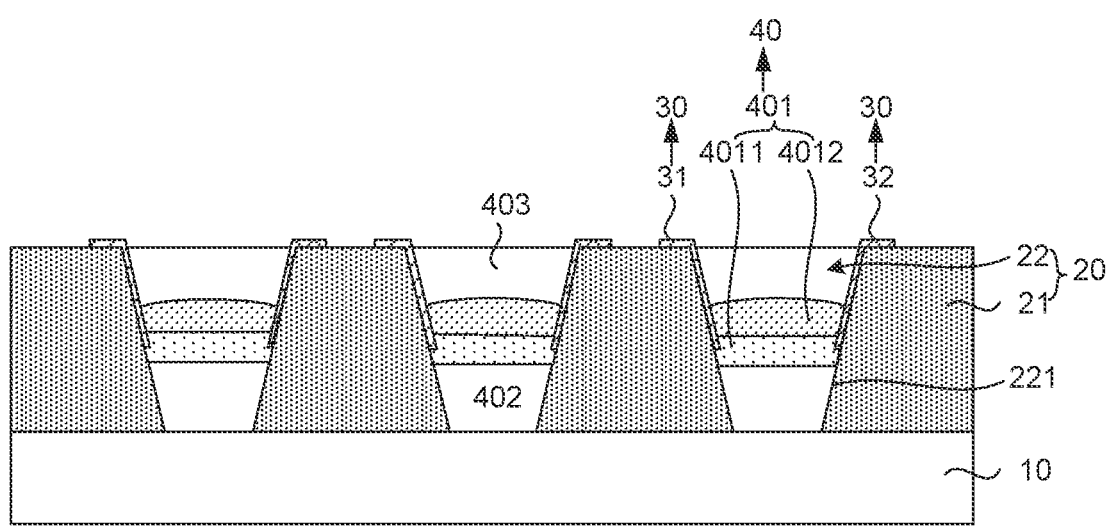
FIG. 10C is a sectional diagram of the substrate taken along direction B-B' in FIG. 1, in accordance with some embodiments.

In some embodiments, as shown in FIGS. 10A-10C, the light-emitting function layer 401 further includes a liquid encapsulation layer 4012 disposed on a side of the liquid light-emitting layer 4011 away from the base 10, and the surface of the liquid light-emitting layer 4011 facing away from the base 10 is in direct contact with the liquid encapsulation layer 4012. The liquid encapsulation layer 4012 is immiscible with the liquid light-emitting layer 4011.

In some embodiments, the liquid encapsulation layer 4012 includes a second liquid. A density of the second liquid is less than a density of the first liquid.

In some examples, the second liquid includes water and a solute dissolved in the water. The solute may be made of a material that is chemically stable and not easy to volatilize, decompose, crystallize or precipitate, such as an electrolyte. The electrolyte includes, for example, lithium bromide (LiBr), sodium sulfate ($Na_2SO_4$), or potassium chloride (KCl).

In some embodiments, to ensure that the density of the second liquid is smaller than the density of the first, a relative molecular mass (in units of 1) of the second liquid may be smaller than the relative molecular mass of the first liquid. In some examples, the relative molecular mass (in units of 1) of the first liquid is greater than or equal to approximately 1000, such as 1000, 1200, or 1500.

Since the density of the second liquid of the liquid encapsulation layer 4012 is less than the density of the first liquid of the liquid light-emitting layer 4011, when the substrate 100 is in a state of a vertical placement (the state of the substrate 100 during actual use) or a state of a horizontal placement (the state of the substrate 100 during manufacturing), the liquid light-emitting layer 4011 is always located on a side of the liquid encapsulation layer 4012 proximate to the base 10. FIGS. 10A to 10C show examples in which the substrate 100 is placed horizontally.

Based on the above embodiments, the liquid encapsulation layer 4012 may isolate the liquid light-emitting layer 4011 from an external environment to protect the liquid light-emitting layer 4011, which may effectively prevent the liquid light-emitting layer 4011 from condensing at a low temperature and evaporating at a high temperature. Furthermore, since the liquid encapsulation layer 4012 is in the liquid state, it may be ensured that a surface of the liquid encapsulation layer 4012 in contact with the liquid light-emitting layer 4011 is a smooth surface, which may effectively prevent the light emitted by the liquid light-emitting layer 4011 from interfering with each other, and which may prevent the total internal reflection from occurring at the interface between the liquid encapsulation layer 4012 and the liquid light-emitting layer 4011.

In some examples, as shown in FIG. 10A, the first electrode 31 and the second electrode 32 each extend along the hole wall 221 of the through hole 22 from the edge of the hole wall 221 away from the base 10 to the lower surface of the liquid light-emitting layer 4011 proximate to the base 10.

In some other examples, as shown in FIG. 10B, the first electrode 31 and the second electrode 32 each extend along the hole wall 221 of the through hole 22 from the edge of the hole wall 221 away from the base 10 to the surface of the liquid encapsulation layer 4012 in contact with the liquid light-emitting layer 4011.

Figure 11A:
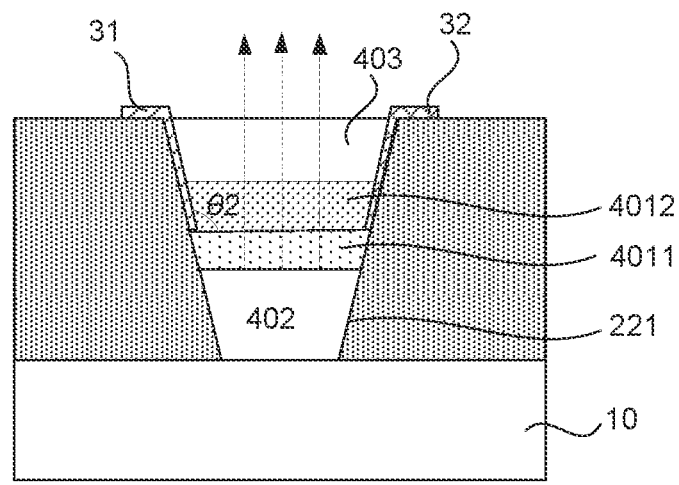
FIG. 11A is a partial sectional diagram of yet another substrate, in accordance with some embodiments.
Figure 11B:
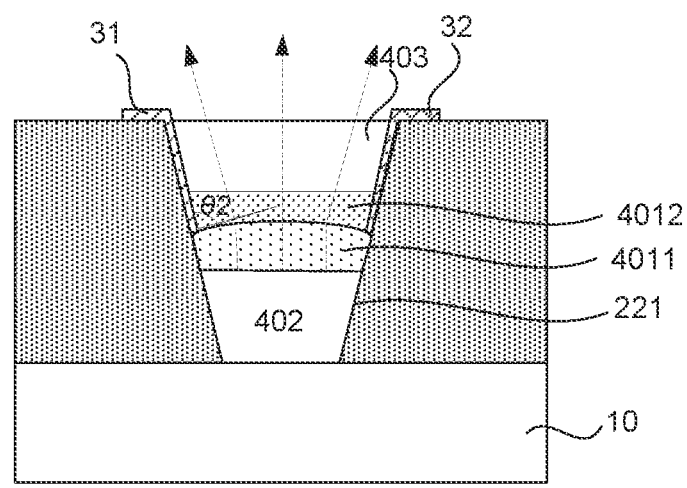
FIG. 11B is a partial sectional diagram of yet another substrate, in accordance with some embodiments.
Figure 11C:
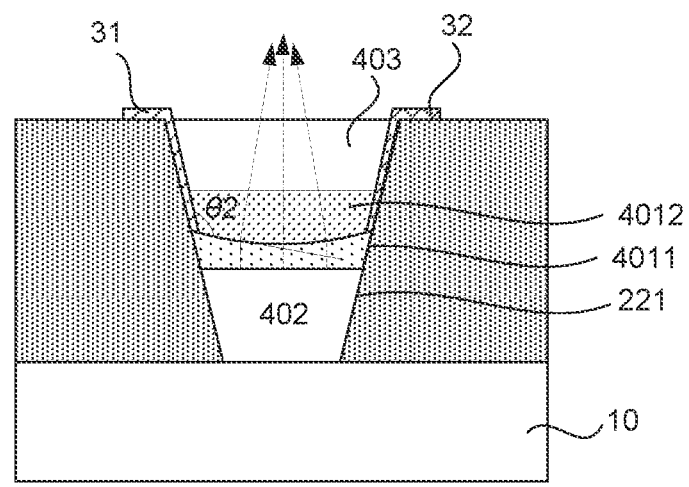
FIG. 11C is a partial sectional diagram of yet another substrate, in accordance with some embodiments.

In this case, as shown in FIGS. 11A to 11C, an electric field formed between the first electrode 31 and the second electrode 32 may act on the liquid encapsulation layer 4012, and changes a contact angle θ2 between the liquid light-emitting layer 4011 and the liquid encapsulation layer 4012.

For example, as shown in FIG. 11A, when the substrate is used, the contact angle 62 between the liquid encapsulation layer 4012 and the liquid light-emitting layer 4011 may be adjusted such that the thickness of the liquid light-emitting layer 4011 and a thickness of the liquid encapsulation layer 4012 may be made uniform, so that the light-emitting device may emit light uniformly.

In this case, the liquid encapsulation layer 4012 is equivalent to a flat-plate lens, and does not converge or diverge the light emitted by the liquid light-emitting layer 4011. The light emitted by the liquid light-emitting layer 4011 may directly pass through the liquid encapsulation layer 4012 and then exit from the liquid encapsulation layer 4012, and thus the viewing angle of the liquid display device may not be changed.

In another example, as shown in FIG. 11B, when the substrate is used, the contact angle 62 between the liquid light-emitting layer 4011 and the liquid encapsulation layer 4012 may be adjusted such that the liquid encapsulation layer 4012 has a shape similar to a concave lens, and the liquid encapsulation layer 4012 can diverge the light emitted by the liquid light-emitting layer 4011, thereby increasing the viewing angle of the liquid display device.

In another example, as shown in FIG. 11C, the contact angle 62 between the liquid light-emitting layer 4011 and the liquid encapsulation layer 4012 may be adjusted such that the liquid encapsulation layer 4012 has a shape similar to a convex lens, and the liquid encapsulation layer 4012 can converge the light emitted by the liquid light-emitting layer 4011, thereby decreasing the viewing angle of the liquid display device.

In some yet other examples, as shown in FIG. 10C, the first electrode 31 and the second electrode 32 each extend along the hole wall 221 of the through hole 22 from the edge of the hole wall 221 away from the base 10 to a position that is between the lower surface of the liquid light-emitting layer 4011 proximate to the base 10 and an upper surface of the liquid light-emitting layer 4011 away from the base 10.

In this case, an electric field formed between the first electrode 31 and the second electrode 32 may act on both the liquid light-emitting layer 4011 and the liquid encapsulation layer 4012, and change the contact angle 62 between the liquid light-emitting layer 4011 and the liquid encapsulation layer 4012.

It will be noted that, a length of a portion of each of the first electrode 31 and the second electrode 32 located between the lower surface of the liquid light-emitting layer 4011 and the upper surface of the liquid light-emitting layer 4011 is not limited in the embodiments of the present disclosure. The length herein refers to a dimension of the portion of the first electrode 31 or the second electrode 32 along the hole wall 221.

In a case where the curvature of the surface of the liquid encapsulation layer 4012 in contact with the liquid light-emitting layer 4011 is changed, the shape of the liquid light-emitting layer 4011 and the shape of the liquid encapsulation layer 4012 are changed accordingly, and thus the uniformity of the light emitted by the light-emitting device 40 may be adjusted. In addition, by adjusting the curvature of the surface of the liquid encapsulation layer 4012 in contact with the liquid light-emitting layer 4011, the light emitted by the light-emitting device 40 may be emitted from the light-emitting device 40 at a specific angle.

For example, as shown in FIG. 11B, the curvature of the light-exit surface of the liquid light-emitting layer 4011 may be adjusted such that the liquid encapsulation layer 4012 has the shape similar to the concave lens, and the liquid encapsulation layer 4012 can diverge the light emitted by the liquid light-emitting layer 4011. In another example, as shown in FIG. 11C, the curvature of the light-exit surface of the liquid light-emitting layer 4011 may be changed such that the liquid encapsulation layer 4012 has the shape similar to the convex lens, and the liquid encapsulation layer 4012 can converge the light emitted by the liquid light-emitting layer 4011.

As shown in FIGS. 11A to 11C, the contact angle θ2 satisfies the following formula:

$$\cos(\pi - \theta 2) = \cos\theta_0 + \frac{U^2 \varepsilon}{2d\eta},$$

where η is a surface tension of the surface of the liquid encapsulation layer 4012 in contact with the liquid light-emitting layer 4011, U is a voltage difference between the first electrode 31 and the second electrode 32, ε is a dielectric constant of the liquid encapsulation layer 4012, d is the thickness of the liquid encapsulation layer 4012, $\theta_0$ is an initial contact angle between the liquid encapsulation layer 4012 and the liquid light-emitting layer 4011 (i.e., a contact angle between the liquid encapsulation layer 4012 and the liquid light-emitting layer 4011 in a case where no voltages are applied to the first electrode 31 and the second electrode 32).

It can be seen from the above formula that when the voltage difference between the first electrode 31 and the second electrode 32 is changed, the contact angle θ2 between the liquid encapsulation layer 4012 and the liquid light-emitting layer 4011 is changed. If the contact angle θ2 is changed, the curvature of the surface of the liquid encapsulation layer 4012 in contact with the liquid light-emitting layer 4011 is changed.

Figure 12:
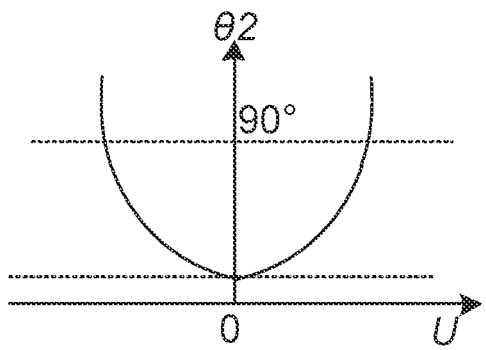
FIG. 12 is a schematic diagram showing a relationship between a voltage between a first electrode and a second electrode and a contact angle between a liquid encapsulation layer and a liquid light-emitting layer, in accordance with some embodiments.

For example, as shown in FIG. 12, the abscissa axis of the coordinate system represents the voltage difference U between the first electrode 31 and the second electrode 32, and the ordinate axis of the coordinate system represents the contact angle θ2 between the liquid encapsulation layer 4012 and the liquid light-emitting layer 4011. It can be seen that the contact angle θ2 between the liquid encapsulation layer 4012 and the liquid light-emitting layer 4011 increases as the voltage difference U between the first electrode 31 and the second electrode 32 increases.

Figure 13:
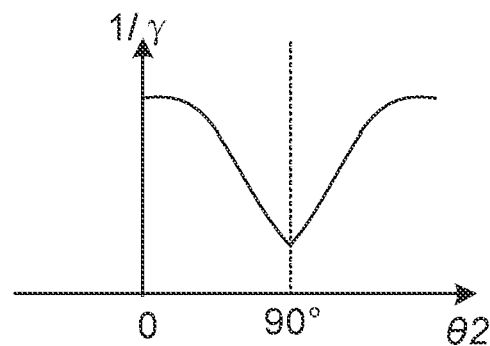
FIG. 13 is a schematic diagram showing a relationship between a contact angle between a liquid encapsulation layer and a liquid light-emitting layer and a curvature of a surface of the liquid encapsulation layer in contact with the liquid light-emitting layer, in accordance with some embodiments.

For example, as shown in FIG. 13, the abscissa axis of the coordinate system represents the contact angle θ2 between the liquid encapsulation layer 4012 and the liquid light-emitting layer 4011, and the ordinate axis of the coordinate system represents the curvature 1/γ of the surface of the liquid encapsulation layer 4012 in contact with the liquid light-emitting layer 4011, wherein γ is a radius of the curvature of the surface of the liquid encapsulation layer 4012 in contact with the liquid light-emitting layer 4011. In a process where the contact angle θ2 increases from 0° to 90°, the curvature 1/γ of the surface of the liquid encapsulation layer 4012 in contact with the liquid light-emitting layer 4011 decreases. In a process where the contact angle θ2 gradually increases from 90°, the curvature 1/γ of the surface of the liquid encapsulation layer 4012 in contact with the liquid light-emitting layer 4011 increases.

Figure 14:
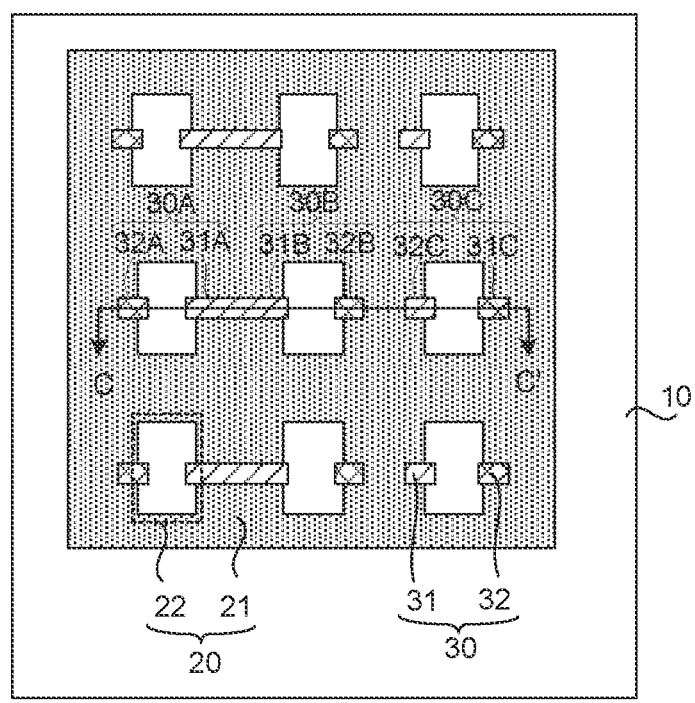
FIG. 14 is a structural diagram of another substrate, in accordance with some embodiments.
Figure 15:
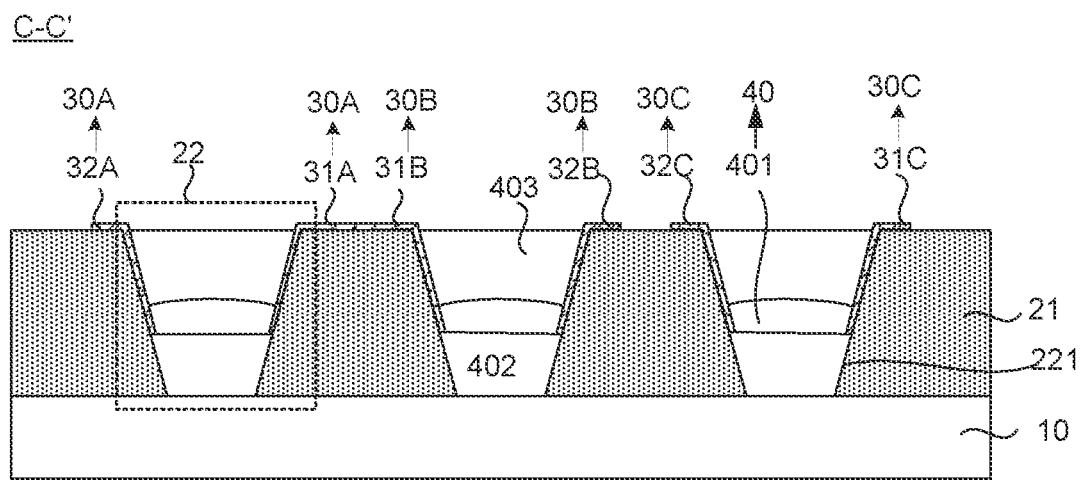
FIG. 15 is a sectional diagram of the substrate in FIG. 14 taken along direction C-C', in accordance with some embodiments.

In some embodiments, as shown in FIGS. 14 and 15, a first electrode 31 of an electrode pair 30 is connected to and integrated with a first electrode 31 of an adjacent electrode pair 30. Second electrodes 32 of any two adjacent electrode pairs 30 are insulated from each other.

For example, as shown in FIGS. 14 and 15, a second electrode pair 30B is adjacent to a first electrode pair 30A and a third electrode pair 30C, the first electrode 31B of the second electrode pair 30B is connected to and integrated with the first electrode 31A of the first electrode pair 30A, and the second electrode 32B of the second electrode pair 30B is insulated from both the second electrode 32A of the first electrode pair 30A and the second electrode 32C of the third electrode pair 30C.

It will be understood that, voltages at two first electrodes 31 that are integrated together are the same. In this way, the voltage difference between the first electrode 31 and the second electrode 32 may be controlled by controlling the voltage applied to the second electrode 32.

In some embodiments, the first electrode 31 and the second electrode 32 are disposed in a same layer. In this way, the first electrode 31 and the second electrode 32 may be formed synchronously through the same patterning process, thereby simplifying manufacturing processes and reducing the cost.

Figure 16:
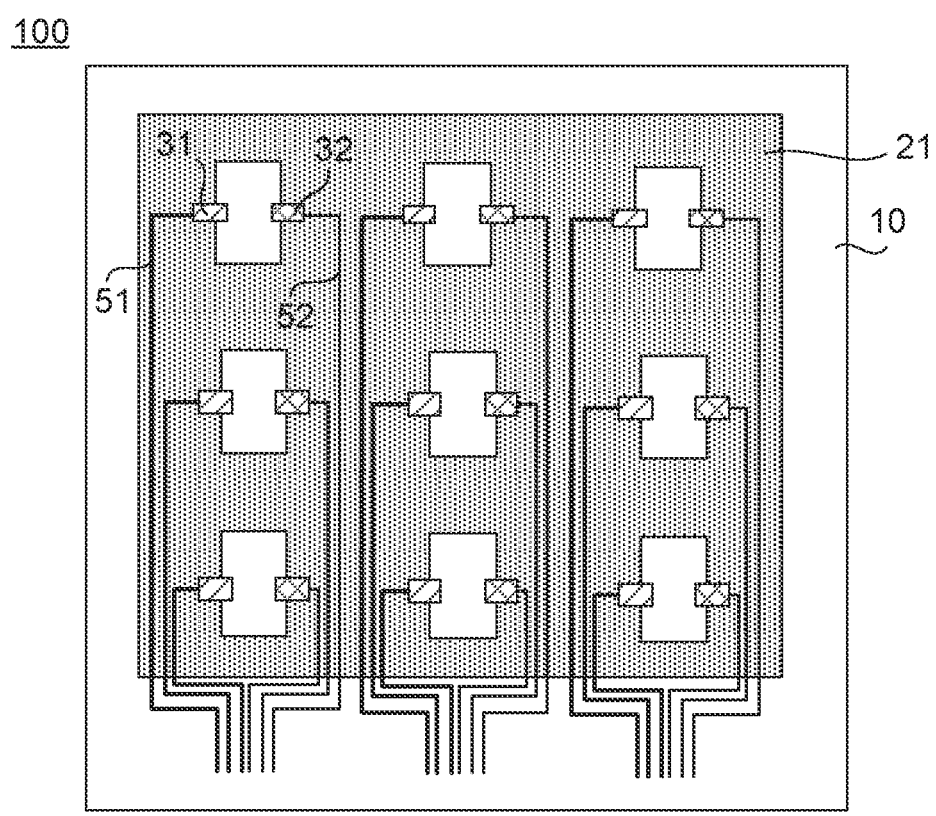
FIG. 16 is a top view of another substrate, in accordance with some embodiments.

In some embodiments, as shown in FIG. 16, the substrate 100 further includes a plurality of first power lines 51 and a plurality of second power lines 52 that are disposed on the base 10 and insulated from each other. The first electrode 31 is electrically connected to a first power line 51, and the second electrode 32 is electrically connected to a second power line 52. A voltage may be applied to the first electrode 31 via the first power line 51, and another voltage may be applied to the second electrode 32 via the second power line 52.

In order to reduce the number of the first power lines 51 and the number of the second power lines 52, in some examples, the first power line 51 may be electrically connected to first electrodes 31 of multiple electrode pairs 30 (e.g., the electrode pairs 30 located in sub-pixel regions in a same column), and the second power line 52 may be electrically connected to second electrodes 32 of multiple electrode pairs 30 (e.g., the electrode pairs 30 located in sub-pixel regions in a same row). The number of the first power lines 51 and the number of the second power lines 52 may be reasonably set in combination with the arrangement of other structures on the substrate 100, as long as the voltage between the first electrode 31 and the second electrode 32 of each electrode pair 30 can be separately controlled.

For example, in a case where voltages applied to all the first electrodes 31 via the plurality of first power lines 51 are the same, and voltages applied to all the second electrodes 32 via the plurality of second power lines 52 are the same, curvatures of surfaces of liquid light-emitting layers 4011 of the plurality of light-emitting devices 40 have a same change. In another example, in a case where the voltages applied to all the first electrodes 31 via the plurality of first power lines 51 are the same, and the voltages applied to all the second electrodes 32 via the plurality of second power lines 52 are not completely the same, the curvatures of the surfaces of the liquid light-emitting layers 4011 of the plurality of light-emitting devices 40 may have different changes.

In some examples, the liquid display device may further include an integrated circuit (IC). The plurality of first power lines 51 and the plurality of second power lines 52 are electrically connected to the IC and receive electrical signals from the IC.

Figure 17:
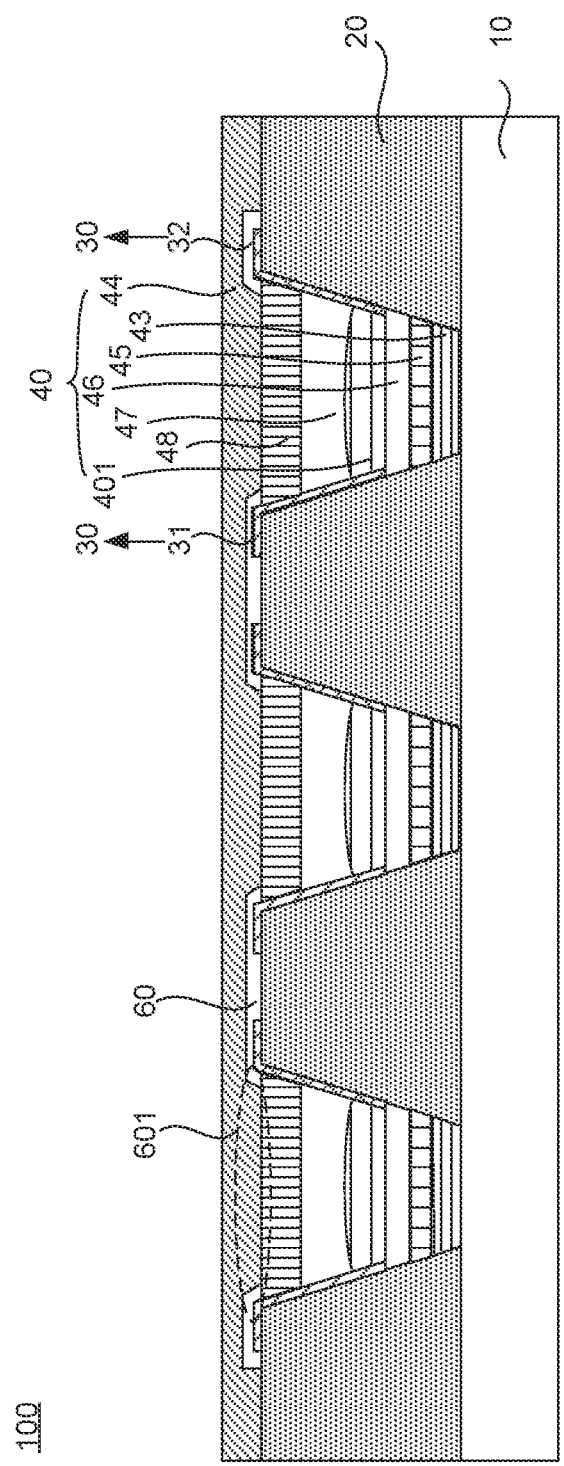
FIG. 17 is a sectional diagram of yet another substrate, in accordance with some embodiments.
Figure 18:
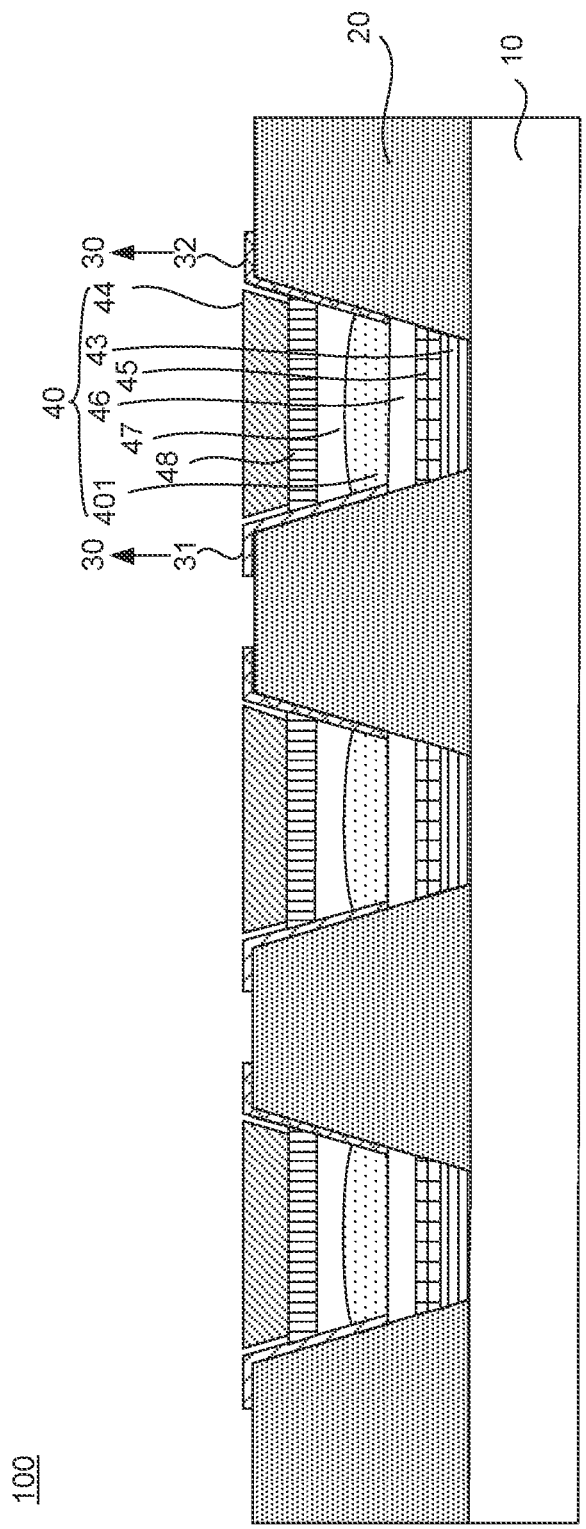
FIG. 18 is a sectional diagram of yet another substrate, in accordance with some embodiments.

In some embodiments, as shown in FIGS. 17 and 18, the light-emitting device 40 further includes a third electrode 43 and a fourth electrode 44. The third electrode 43 is located at a side of the liquid functional layer 401 proximate to the base 10, and the fourth electrode 44 is located at a side of the liquid functional layer 401 away from the base 10. The third electrode 43 and the fourth electrode 44 are both insulated from the first electrode 31 and the second electrode 32. For example, the third electrode 43 is an anode, and the fourth electrode 44 is a cathode.

In some examples, as shown in FIG. 17, fourth electrodes 44 of the plurality of light-emitting devices 40 are connected and integrated to form an integrated structure, and the integrated structure covers the pixel defining layer 20.

In this case, in order to avoid a short circuit between the fourth electrodes 44 and the electrode pairs 30, as shown in FIG. 17, the substrate 100 further includes an insulating layer 60 disposed between the fourth electrodes 44 and the plurality of electrode pairs 30. The insulating layer 60 includes a plurality of hollowed-out portions 601. Each hollowed-out portion 601 corresponds to a through hole 22, and an orthographic projection of the hollowed-out portion 601 on the base 10 overlaps with an orthographic projection of the through hole 22 on the base 10. The fourth electrode 44 is insulated from the first electrode 31 and the second electrode 32 through the insulating layer 60.

In some other examples, as shown in FIG. 18, the fourth electrodes 44 are located only in regions where the through holes 21 are located, respectively.

In some embodiments, as shown in FIGS. 17 and 18, the light-emitting device 40 further includes a hole injection layer 45, a hole transport layer 46, an electron injection layer 47 and an electron transport layer 48.

The hole injection layer 45 is located between the third electrode 43 and the liquid functional layer 401. The hole transport layer 46 is located between the hole injection layer 45 and the liquid functional layer 401. The electron injection layer 47 is located between the fourth electrode 44 and the liquid functional layer 401. The electron transport layer 48 is located between the electron injection layer 47 and the liquid functional layer 401.

Figure 19:
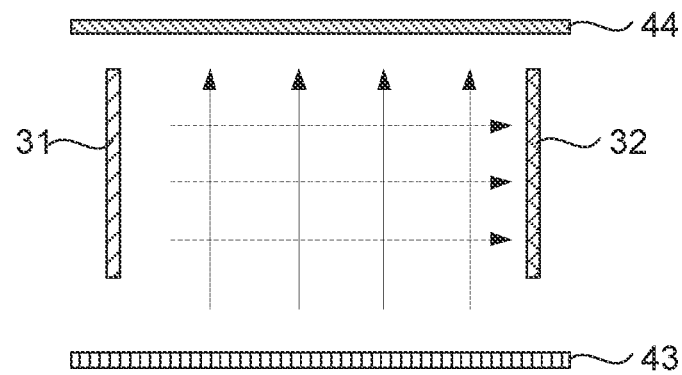
FIG. 19 is a schematic diagram of an electric field in a substrate, in accordance with some embodiments.

As shown in FIG. 19, a direction of a first electric field formed between the third electrode 43 and the fourth electrode 44 is shown by the solid arrows, a direction of a second electric field formed between the first electrode 31 and the second electrode 32 is shown by the dashed arrows, and the direction of the first electric field is perpendicular to the direction of the second electric field. In this case, the first electric field formed between the third electrode 43 and the fourth electrode 44 does not affect the curvature of the surface of the liquid light-emitting layer 4011.

Figure 20:
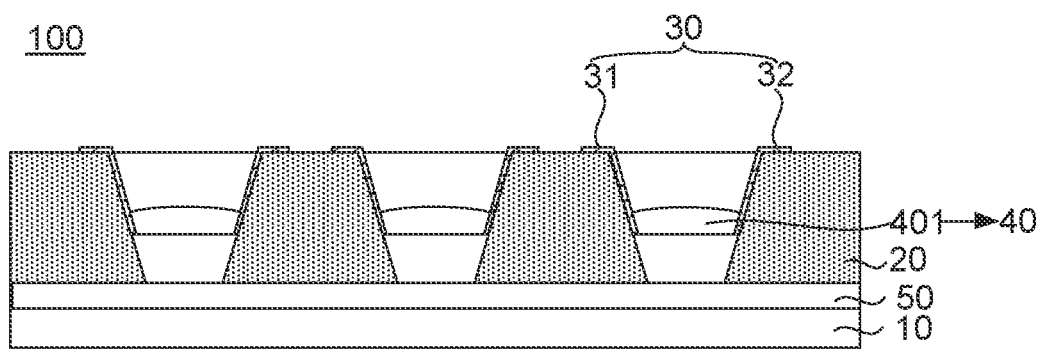
FIG. 20 is a sectional diagram of yet another substrate, in accordance with some embodiments.

In some embodiments, as shown in FIG. 20, the substrate 100 further includes a plurality of pixel driver circuits 50 disposed between the base 10 and the plurality of light-emitting devices 40. One of the plurality of pixel driving circuits 50 is electrically connected to a third electrode 43 of a corresponding light-emitting device 40, and the pixel driver circuit 50 is configured to drive the liquid light-emitting layer 4011 to emit light. In some examples, each pixel driver circuit 50 is electrically connected to a third electrode 43 of a corresponding light-emitting device 40.

For example, the pixel driver circuit 50 has a 2T1C structure. That is, the pixel driver circuit 50 includes two thin-film transistors (TFTs) and one capacitor, and the two TFTs include a switching TFT and a driving TFT.

The pixel driver circuit 50 may also have other structures, such as a 3T1C structure (i.e., the pixel driver circuit 50 includes three TFTs and one capacitor), a 5T1C structure (i.e., the pixel driver circuit 50 includes five TFTs and one capacitor), or a 7T1C structure (i.e., the pixel driver circuit 50 includes seven TFTs and one capacitor). That is, the pixel driver circuit 50 may include at least two TFTs and at least one capacitor.

Figure 21:
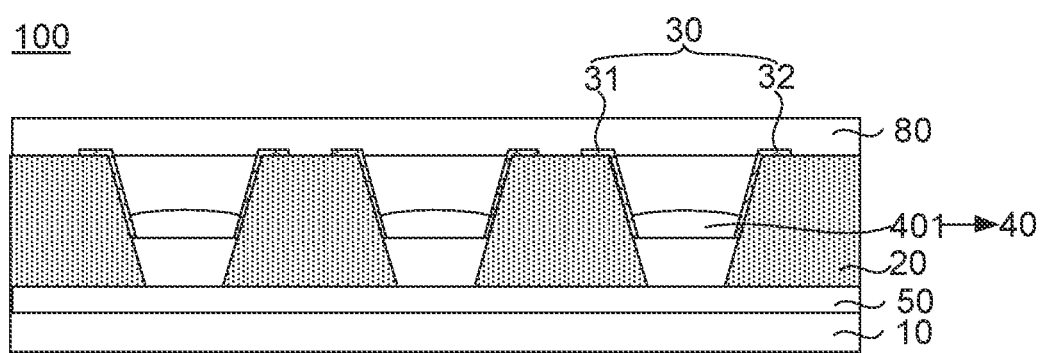
FIG. 21 is a sectional diagram of yet another substrate, in accordance with some embodiments.

In some embodiments, as shown in FIG. 21, the substrate 100 further includes a solid encapsulation layer 80 disposed on sides of the plurality of light-emitting devices 40 away from the base 10. The solid encapsulation layer 80 covers the pixel defining layer 20. For example, the solid encapsulation layer 80 is an encapsulation substrate of a display panel to which the substrate 10 is applied, and is a flexible film. In another example, the encapsulation substrate is a rigid substrate, and the solid encapsulation layer 80 is located between the encapsulation substrate and the base 10.

In some examples, the solid encapsulation layer 80 has a multilayer structure. For example, the solid encapsulation layer 80 includes at least one organic encapsulation sub-layer and inorganic encapsulation sub-layers located on upper and lower sides of each organic encapsulation sub-layer in the thickness direction of the base 10 to block external water and oxygen.

Figure 5:
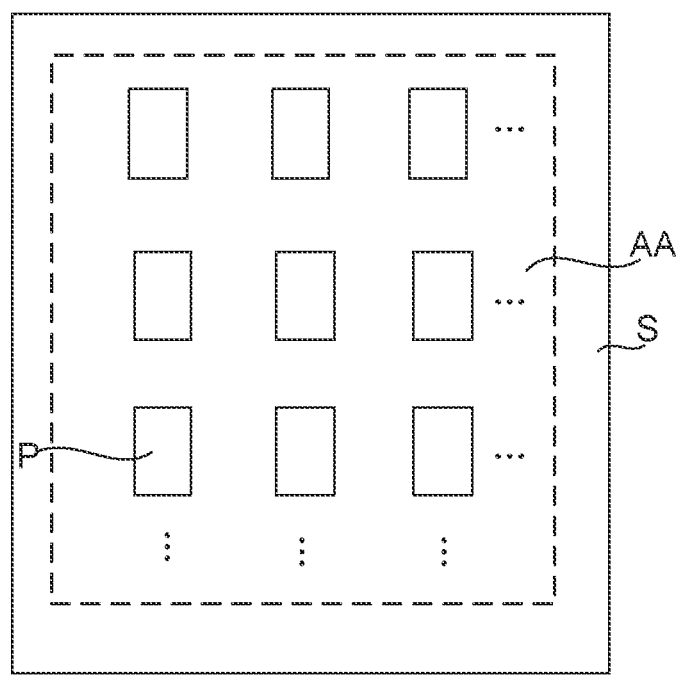
FIG. 5 is a plan view of a display panel, in accordance with some embodiments.

In some embodiments, as shown in FIG. 5, a display panel 500 is provided. The display panel 500 includes the substrate 100. For example, the display panel 500 may be applied to a liquid display device, such as a QLED display device, an electronic ink display device, a microcapsule display device, or a microlens array display device.

In some examples, the display panel 500 is a self-luminescent display panel. For example, the display panel 500 is an OLED display panel, or a QLED display panel. The substrate 100 is an array substrate of the self-luminescent display panel.

As shown in FIG. 5, the display panel 500 has an active area AA and a peripheral region S located at a periphery of the active area AA. Depending on the different designs of the active area AA, the position of the peripheral region S may be changed accordingly. For example, the active area AA is in a shape of a rectangle, and the peripheral area S may be located on one side, two opposite sides, three sides, or all sides (as shown in FIG. 5) of the active area AA. Of course, the active area AA may also have other shapes, such as a circular shape. In this case, the peripheral area S may surround the active area AA.

As shown in FIG. 5, the active area AA includes a plurality of sub-pixel regions P. For example, the plurality of sub-pixels P are arranged in an array.

In some embodiments, each of the plurality of through holes 22 in the substrate 100 is located in a corresponding sub-pixel region P. Accordingly, the light-emitting device 40 located in the through hole 22 is also located in the sub-pixel region P corresponding to the through hole 22.

In some examples, the plurality of light-emitting devices 40 include a plurality of first light-emitting devices, a plurality of second light-emitting devices, and a plurality of third light-emitting devices. Each first light-emitting device is configured to emit light of a first color, each second light-emitting device is configured to emit light of a second color, and each third light-emitting device is configured to emit light of a third color. The first color, the second color and the third color are three primary colors (e.g., red, green and blue, respectively).

In some other examples, the light emitted by the plurality of light-emitting devices 40 is white light. The display panel 500 further includes a color filter layer, and the color filter layer is disposed on a light-exit side of the plurality of light-emitting devices 40. For example, the color filter layer includes a plurality of first color photoresist units, a plurality of second color photoresist units, and a plurality of third color photoresist units. Each first color photoresist unit is located in a corresponding sub-pixel region, each second color photoresist unit is located in a corresponding sub-pixel region, and each third color photoresist unit is located in a corresponding sub-pixel region.

Figure 6:
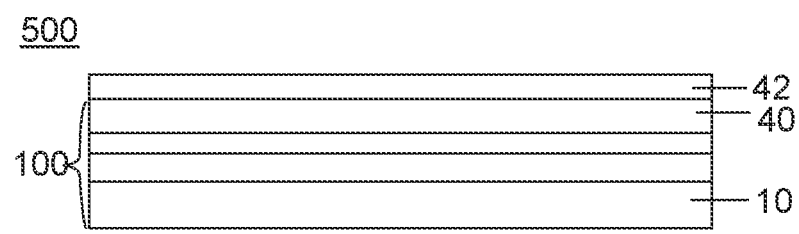
FIG. 6 is a sectional diagram of a display panel, in accordance with some embodiments.

In a case where the display panel 500 is the QLED display panel, as shown in FIG. 6, the display panel 500 further includes an encapsulation substrate 42. The encapsulation substrate 42 is disposed on a side of the light-emitting devices 40 away from the base 10. In this case, the liquid light-emitting layer 4011 of the light-emitting device 40 in the substrate 100 is made of a quantum dot material.

The encapsulation substrate 42 is a flexible film, or a rigid substrate such as a glass substrate.

Figure 9:
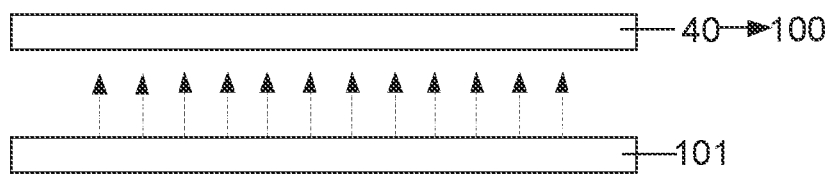
FIG. 9 is a structural diagram of a display panel, in accordance with some embodiments.

In some examples, in a case where the liquid light-emitting layer 4011 includes the first liquid and the particles, and the particles are quantum dots, as shown in FIG. 9, the display panel 500 further includes a backlight 101, and the substrate 100 is disposed at a light-exit side of the backlight 101. The backlight 101 is configured to provide incident light to the substrate 100.

For example, the dashed arrows shown in FIG. 9 represent incident light emitted by the backlight 101, so that the quantum dots in the liquid light-emitting layer 4011 of the light-emitting device 40 emits light in response to receiving incident light.

For example, the backlight 101 is configured to provide blue incident light, and the plurality of light-emitting devices 40 includes a plurality of first light-emitting devices and a plurality of second light-emitting devices. Each first light-emitting device is configured to emit red light in response to receiving blue incident light. Each second light-emitting device is configured to emit green light in response to receiving blue incident light. As for each sub-pixel region emitting blue light, a through hole 22 located in the sub-pixel region is filled with a transparent layer to transmit blue light.

In some embodiments, the substrate 100 of the display panel 500 is a color filter substrate. In this case, the display panel 500 may further include a glass cover plate disposed on a surface of the substrate 100 proximate to the pixel defining layer 20 to protect the substrate 100.

The forgoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A substrate, comprising:
a base;
a pixel defining layer disposed on the base, the pixel defining layer including a plurality of through holes;
a plurality of electrode pairs, wherein at least one electrode pair includes a first electrode and a second electrode disposed at least on a hole wall of one of the through holes and at least partially opposite to each other, and the first electrode and the second electrode are insulated from each other; and
a plurality of light-emitting devices, wherein one of the plurality of light-emitting devices includes a liquid functional layer disposed in the through hole, a third electrode, a fourth electrode, a hole injection layer, a hole transport layer, an electron injection layer, and an electron transport layer,
wherein the liquid functional layer is in direct contact with the first electrode and the second electrode, and the liquid functional layer includes a liquid light-emitting layer configured to emit light;
the third electrode and the fourth electrode are both insulated from the first electrode and the second electrode, the third electrode is located at a side of the liquid functional layer proximate to the base, and the fourth electrode is located at a side of the liquid functional layer away from the base;
the hole injection layer is located between the third electrode and the liquid functional layer;
the hole transport layer is located between the hole injection layer and the liquid functional layer;
the electron injection layer is located between the fourth electrode and the liquid functional layer; and
the electron transport layer is located between the electron injection layer and the liquid functional layer.

2. The substrate according to claim 1, wherein the first electrode and the second electrode each extend along the hole wall from an edge of the hole wall away from the base to a lower surface of the liquid light-emitting layer proximate to the base.

3. The substrate according to claim 1, wherein the liquid functional layer further includes a liquid encapsulation layer disposed on a side of the liquid light-emitting layer away from the base and is in direct contact with the liquid light-emitting layer; the liquid light-emitting layer includes a first liquid, and the liquid encapsulation layer includes a second liquid immiscible with the first liquid; and a density of the second liquid is less than a density of the first liquid.

4. The substrate according to claim 3, wherein the first electrode and the second electrode each extend along the hole wall from an edge of the hole wall away from the base to a lower surface of the liquid light-emitting layer proximate to the base.

5. The substrate according to claim 3, wherein the first electrode and the second electrode each extend along the hole wall from an edge of the hole wall away from the base to a surface of the liquid encapsulation layer in contact with the liquid light-emitting layer.

6. The substrate according to claim 3, wherein a relative molecular mass of the first liquid is greater than a relative molecular mass of the second liquid.

7. The substrate according to claim 6, wherein the first liquid includes an organic solvent and a dispersant dissolved in the organic solvent.

8. The substrate according to claim 1, wherein the plurality of electrode pairs includes at least one electrode pair which includes a first electrode connected to and integrated with another first electrode of an adjacent electrode pair, and second electrodes of any two adjacent electrode pairs are insulated from each other.

9. The substrate according to claim 1, wherein the first electrode and the second electrode are disposed in a same layer.

10. The substrate according to claim 1, further comprising a plurality of first power lines and a plurality of second power lines that are disposed on the base and insulated from each other, wherein the first electrode is electrically connected to a corresponding one of the first power lines, and the second electrode is electrically connected to a corresponding one of the second power lines.

11. The substrate according to claim 1, wherein fourth electrodes of the plurality of light-emitting devices are integrated to form an integrated structure, and the integrated structure covers the pixel defining layer.

12. The substrate according to claim 11, further comprising an insulating layer disposed between the fourth electrodes and the plurality of electrode pairs, wherein the insulating layer includes a plurality of hollowed-out portions, each hollowed-out portion corresponds to a through hole, and an orthographic projection of the hollowed-out portion on the base overlaps with an orthographic projection of the through hole on the base.

13. The substrate according to claim 1, further comprising a plurality of pixel driver circuits disposed between the base and the plurality of light-emitting devices, wherein each pixel driver circuit is electrically connected to a third electrode of a corresponding light-emitting device; and the pixel driver circuit is configured to drive the liquid light-emitting layer to emit light.

14. The substrate according to claim 1, further comprising a solid encapsulation layer disposed on a side of the light-emitting device away from the base, wherein the solid encapsulation layer covers the pixel defining layer.

15. The substrate according to claim 1, wherein the first electrode and the second electrode are made of a same material.

16. The substrate according to claim 1, wherein the liquid light-emitting layer includes a first liquid and particles suspended in the first liquid, and the particles are quantum dots.

17. A display panel, comprising the substrate according to claim 1.

18. The display panel according to claim 17, further comprising a backlight, wherein the substrate is disposed at a light-exit side of the backlight, and the liquid light-emitting layer includes a first liquid and particles suspended in the first liquid, and the particles are quantum dots.

* * * * *